(12) United States Patent
Wei et al.

(10) Patent No.: US 12,535,978 B2
(45) Date of Patent: Jan. 27, 2026

(54) DISPLAY DEVICE AND SIGNAL SYNCHRONIZATION METHOD THEREOF, AND PIXEL CIRCUIT

(71) Applicants: Hefei BOE Joint Technology Co., Ltd., Anhui (CN); BOE TECHNOLOGY GROUP CO., LTD., Beijing (CN)

(72) Inventors: Xiaolong Wei, Beijing (CN); Wenchao Bao, Beijing (CN); Song Meng, Beijing (CN); Yao Zhang, Beijing (CN); Miao Liu, Beijing (CN); Cheng Xu, Beijing (CN); Jingbo Xu, Beijing (CN)

(73) Assignees: Hefei BOE Joint Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 203 days.

(21) Appl. No.: 18/261,152

(22) PCT Filed: Jun. 29, 2022

(86) PCT No.: PCT/CN2022/102212
§ 371 (c)(1),
(2) Date: Jul. 12, 2023

(87) PCT Pub. No.: WO2024/000228
PCT Pub. Date: Jan. 4, 2024

(65) Prior Publication Data
US 2024/0402966 A1    Dec. 5, 2024

(51) Int. Cl.
*G06F 3/14*    (2006.01)
(52) U.S. Cl.
CPC .................................... *G06F 3/14* (2013.01)

(58) Field of Classification Search
CPC ........ G06F 3/14; G09G 3/20; G09G 2310/00; G09G 2320/00; G09G 2340/00
See application file for complete search history.

(56) References Cited

U.S. PATENT DOCUMENTS

2007/0057865 A1* 3/2007 Song ..................... G06F 3/1431
345/1.1
2011/0043499 A1 2/2011 Cok et al.
(Continued)

FOREIGN PATENT DOCUMENTS

| CN | 1570737 A | 1/2005 |
| CN | 101146572 A | 3/2008 |

(Continued)

OTHER PUBLICATIONS

PCT International Search Report (w/ English translation) and Written Opinion for corresponding Application No. PCT/CN2022/102212, mailed Jan. 3, 2023, 10 pages.

*Primary Examiner* — Sejoon Ahn
(74) *Attorney, Agent, or Firm* — Dority & Manning, PA

(57) ABSTRACT

A display device includes: a display screen, a drive circuit, a first controller and a second controller. The display screen includes a first display region and a second display region. The drive circuit is configured to transmit a control signal to at least one of the first controller or the second controller. The first controller is configured to, responding to the control signal, perform a display control on the first display region. The second controller is configured to, responding to the control signal, perform a display control on the second display region. A display time difference between the first display region and the second display region is less than a threshold time period.

11 Claims, 10 Drawing Sheets

(56) References Cited

U.S. PATENT DOCUMENTS

| | | | |
|---|---|---|---|
| 2012/0169698 A1* | 7/2012 | Park | G09G 3/20 |
| | | | 345/211 |
| 2013/0265290 A1 | 10/2013 | Lee | |
| 2014/0204065 A1* | 7/2014 | Park | G09G 3/2033 |
| | | | 345/204 |
| 2015/0255041 A1 | 9/2015 | Liu et al. | |
| 2015/0339967 A1* | 11/2015 | Shin | G09G 3/2003 |
| | | | 345/690 |
| 2016/0195961 A1* | 7/2016 | Ludden | G09G 3/20 |
| | | | 345/174 |
| 2018/0182278 A1 | 6/2018 | Kim et al. | |
| 2022/0084469 A1 | 3/2022 | Pyun et al. | |
| 2022/0122500 A1 | 4/2022 | Wai et al. | |

FOREIGN PATENT DOCUMENTS

| | | |
|---|---|---|
| CN | 101552733 A | 10/2009 |
| CN | 102368379 A | 3/2012 |
| CN | 110012247 A | 7/2019 |
| CN | 112967679 A | 6/2021 |

\* cited by examiner

DISPLAY DEVICE AND SIGNAL SYNCHRONIZATION METHOD THEREOF, AND PIXEL CIRCUIT

CROSS-REFERENCE TO RELATED APPLICATION

This application is a national phase entry under 35 USC 371 of International Patent Application No. PCT/CN2022/102212 filed on Jun. 29, 2022, which is incorporated herein by reference in its entirety.

TECHNICAL FIELD

The present disclosure relates to the field of display technologies, and in particular, to a display device and a signal synchronization method thereof, and a pixel circuit.

BACKGROUND

With the development of the field of electronic application technologies, new challenges have been posed to the capacity, performance, and speed of field programmable gate arrays (FPGAs). A single FPGA may not meet requirements of complex systems, so it is necessary to use multiple FPGAs to control some large or complex systems. For example, for some ultra-large size organic light-emitting diode (OLED) products, multiple FPGAs are generally used to control different display regions of an ultra-large size OLED product.

SUMMARY

In an aspect, a display device is provided. The display device includes: a display screen, a drive circuit, a first controller and a second controller. The display screen includes a first display region and a second display region. The drive circuit is configured to transmit a control signal to at least one of the first controller or the second controller. The first controller is configured to, responding to the control signal, perform a display control on the first display region. The second controller is configured to, responding to the control signal, perform a display control on the second display region. A display time difference between the first display region and the second display region is less than a threshold time period.

In some embodiments, the first controller is configured to: receive the control signal, obtain a first control command according to the control signal, and send the first control command to the second controller; and after delaying for a first time period from sending the first control command to the second controller, perform the display control on the first display region based on the first control command, where the first time period is a time period from a time when the first controller sends the first control command to the second controller to a time when the second controller receives and obtains the first control command; and the second controller is configured to: receive the first control command, and perform the display control on the second display region based on the first control command.

In some embodiments, the first controller is a master controller, and the second controller is a slave controller.

In some embodiments, the first controller is configured to: receive the control signal, obtain a first control command according to the control signal, and send the first control command to the second controller; the second controller is configured to: receive the control signal, obtain a second control command according to the control signal, and send the second control command to the first controller; the first controller is further configured to: receive the second control command, and obtain a third control command based on the first control command and the second control command; and perform the display control on the first display region according to the third control command; and the second controller is further configured to: receive the first control command, and obtain a fourth control command based on the first control command and the second control command; and perform the display control on the second display region according to the fourth control command.

In some embodiments, the third control command and the fourth control command are same, or a rate of signal overlap between the third control command and the fourth control command is greater than 99%.

In some embodiments, the first controller is further configured to perform an AND operation on the first control command and the second control command to obtain the third control command; and the second controller is further configured to perform an AND operation on the first control command and the second control command to obtain the fourth control command.

In some embodiments, the first controller and the second controller are configured in such way that at least one of the first control command or the second control command is transmitted therebetween through a low-voltage differential signal (LVDS) or a pin-to-pin.

In some embodiments, the second controller is configured to: receive the control signal, and obtain a second control command according to the control signal; and perform the display control on the second display region based on the second control command; and the first controller is configured to: receive the control signal, and obtain a first control command according to the control signal; and after delaying for a second time period from obtaining the control signal, perform the display control on the first display region based on the first control command, where the second time period is a time period from a time when the second controller receives the control signal to a time when the first controller receives the control signal.

In some embodiments, the display device further includes: a signal line between the drive circuit and the first controller, and a signal line between the drive circuit and the second controller, where a length of the signal line from the drive circuit to the first controller is equal to a length of the signal line from the drive circuit to the second controller.

In some embodiments, the control signal is configured to control the display screen to be on or off; the control signal includes a compensation signal, and the compensation signal is configured to compensate for at least one of a threshold voltage or a mobility of transistors in the first display region and the second display region.

In some embodiments, the threshold time period is less than 14.4 microseconds.

In another aspect, a pixel circuit is provided. The pixel circuit is applied to a display screen. The display screen includes a first display region and a second display region, a pixel circuit in the first display region and a pixel circuit in the second display region are each the pixel circuit, and configured to receive a compensation signal, and the compensation signal is configured to compensate at least one of a threshold voltage or a mobility of transistors of the pixel circuits in the first display region and the second display region, so that a display time difference between the first display region and the second display region is less than a threshold time period.

In some embodiments, the threshold time period is less than 14.4 microseconds.

In still another aspect, a signal synchronization method of a display device is provided. The display device includes a display screen, a first controller and a second controller, the display screen includes a first display region and a second display region, the first controller is configured to control the first display region, and the second controller is configured to control the second display region. The signal synchronization method includes: receiving, by at least one of the first controller or the second controller, a control signal from a drive circuit; performing, by the at least one of the first controller or the second controller, a display control on a corresponding display region responding to the control signal, including at least one of: performing, by the first controller, a display control on the first display region responding to the control signal; or performing, by the second controller, a display control on the second display region responding to the control signal, where a display time difference between the first display region and the second display region is less than a threshold time period.

In some embodiments, in a case where the first controller receives the control signal from the drive circuit, the method further includes: obtaining, by the first controller, a first control command according to the control signal, and sending, by the first controller, the first control command to the second controller; and receiving, by the second controller, the first control command from the first controller, and performing, by the second controller, the display control on the second display region based on the first control command. Performing, by the first controller, the display control on the first display region, includes: after delaying for a first time period from sending the first control command to the second controller, performing the display control on the first display region based on the first control command, where the first time period is a time period from a time when the first controller sends the first control command to the second controller to a time when the second controller receives and obtains the first control command.

In some embodiments, in a case where the first controller and the second controller receive the control signal from the drive circuit, the method further includes: obtaining, by the first controller, a first control command according to the control signal, and sending, by the first controller, the first control command to the second controller; obtaining, by the second controller, a second control command according to the control signal, and sending, by the second controller, the second control command to the first controller; receiving, by the first controller, the second control command; and receiving, by the second controller, the first control command. Performing, by the first controller, the display control on the first display region, includes: obtaining, by the first controller, a third control command based on the first control command and the second control command; and performing, by the first controller, the display control on the first display region according to the third control command; and performing, by the second controller, the display control on the second display region, includes: obtaining, by the second controller, a fourth control command based on the first control command and the second control command; and performing, by the second controller, the display control on the second display region according to the fourth control command.

In some embodiments, the third control command and the fourth control command are same, or a rate of signal overlap between the third control command and the fourth control command is greater than 99%.

In some embodiments, obtaining the third control command based on the first control command and the second control command, includes: performing an AND operation on the first control command and the second control command to obtain the third control command.

In some embodiments, in a case where the first controller and the second controller receive the control signal from the drive circuit, the method further includes: obtaining, by the second controller, a second control command according to the control signal; and performing, by the second controller, the display control on the second display region based on the second control command; and obtaining, by the first controller, a first control command according to the control signal. Performing, by the first controller, the display control on the first display region, includes: after delaying for a second time period from obtaining the control signal, performing the display control on the first display region based on the first control command, where the second time period is a time period from a time when the second controller receives the control signal to a time when the first controller receives the control signal.

In some embodiments, the control signal is configured to control the display screen to be on or off; the control signal includes a compensation signal, and the compensation signal is configured to compensate for at least one of a threshold voltage or a mobility of transistors in the first display region and the second display region.

In some embodiments, the threshold time period is less than 14.4 microseconds.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person having ordinary skill in the art can obtain other drawings according to these accompanying drawings. In addition, the accompanying drawings to be described below may be regarded as schematic diagrams, and are not limitations on an actual size of a product, an actual process of a method and an actual timing of a signal involved in the embodiments of the present disclosure.

DETAILED DESCRIPTION

Figure 1:
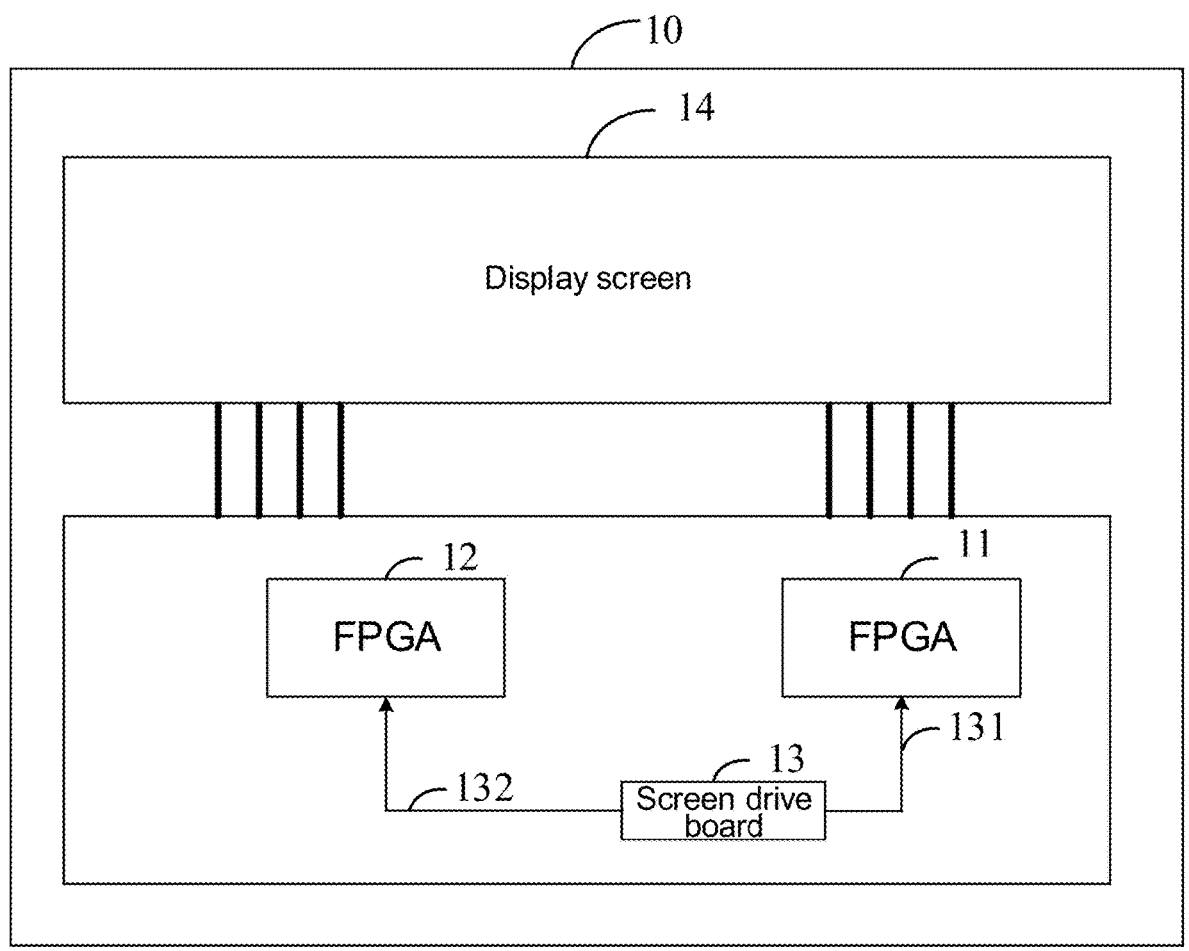
FIG. 1 is a structural diagram of a display device.

The technical solutions in embodiments of the present disclosure will be described clearly and completely with reference to the accompanying drawings. Obviously, the described embodiments are merely some but not all of embodiments of the present disclosure. All other embodiments obtained by a person having ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "a plurality of/the plurality of/multiple" means two or more unless otherwise specified.

Some embodiments may be described using the terms "coupled", "connected" and their derivatives. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is, optionally, construed to mean "when" or "in a case where" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

The use of "applicable to" or "configured to" herein means an open and inclusive expression, which does not exclude devices that are applicable to or configured to perform additional tasks or steps.

Additionally, the use of the phrase "based on" is meant to be open and inclusive, since a process, step, calculation or other action that is "based on" one or more of the stated conditions or values may, in practice, be based on additional conditions or value beyond those stated.

The term such as "about," "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

Generally, for some display devices with complex systems or larger sizes, if a single field programmable gate array (FPGA) is used, in an aspect, requirements on parameters such as performance and capacity of the FPGA will be very high, and thus, a large cost is generated, which is not cost-effective in consideration of system cost; in another aspect, with the development of the electronic field, the single FPGA cannot be applicable to a large or complex system, and thus, multiple FPGAs are used to control a display device.

FIG. 1 is a structural diagram of a display device. As shown in FIG. 1, the display device 10 includes an FPGA 11, an FPGA 12, a screen drive (time control register, TCON) board 13, and a display screen 14. The FPGA 11 is used to perform a display control on a right half of the display screen 14, and the FPGA 12 is used to perform a display control on a left half of the display screen 14.

The TOCN board 13 is used to send a control signal to the FPGA 11 and the FPGA 12, for example, the control signal is a power-off compensation signal that controls the display screen 14 to be off. In a case where the TOCN board 13 sends the power-off compensation signal to the FPGA 11 and the FPGA 12, the FPGA 11 and the FPGA 12 each receive the power-off compensation signal, process the power-off compensation signal, and generate a corresponding power-off compensation command (e.g., Sense Vth, Sense K, and the like). And the FPGA 11 and the FPGA 12 respectively control light-emitting elements in the right half of the display screen 14 and light-emitting elements in the left half of the display screen 14 to be off according to power-off compensation commands generated respectively.

However, a wiring from the TCON board 13 to the FPGA 11 and a wiring from the TCON board 13 to the FPGA 12 are different, that is, lengths of a signal line 131 from the TCON board 13 to the FPGA 11 and a signal line 132 from the TCON board 13 to the FPGA 12 are different, and thus, a time for receiving the power-off compensation signal by the FPGA 11 is not consistent with a time for receiving the power-off compensation signal by the FPGA 12. As a result, a time for controlling the right half of the display screen 14 to be off by the FPGA 11 and a time for controlling the left half of the display screen 14 to be off by the FPGA 12 are asynchronous, which causes a phenomenon that an image in the left of the display screen 14 is separated from an image in the right of the display screen 14.

Figure 2:
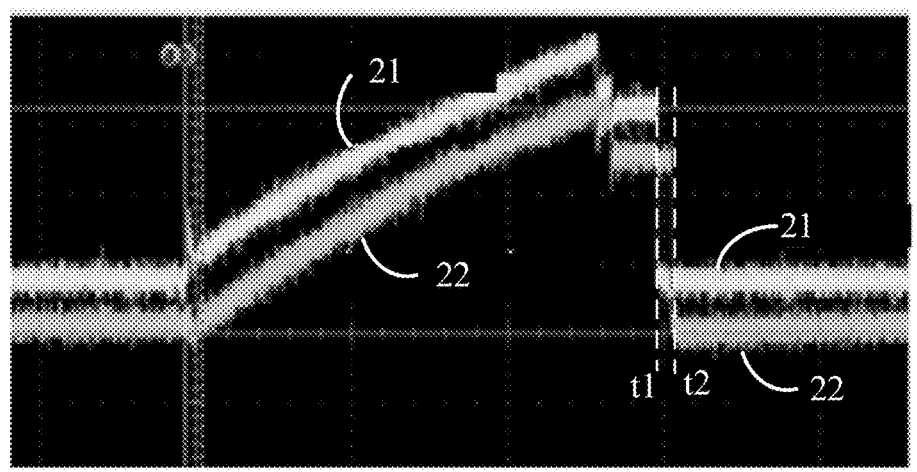
FIG. 2 is a schematic diagram showing power-off compensation signals received by FPGAs.

For example, as shown in FIG. 1, the length of the signal line 131 from the TCON board 13 to the FPGA 11 is less than the length of the signal line 132 from the TCON board 13 to the FPGA 12, and thus, as shown in FIG. 2, the time t2 when the FPGA 12 receives the power-off compensation signal 22 sent by the TCON board 13 is later than the time t1 when the FPGA 11 receives the power-off compensation signal 21 sent by the TCON board 13.

In light of this, some embodiments of the present disclosure provide a display device, which can ensure that multiple controllers control light-emitting elements in corresponding display regions in a display screen to be on or off simultaneously, so that the display screen does not have the problem of splitting-screen.

Figure 3A:
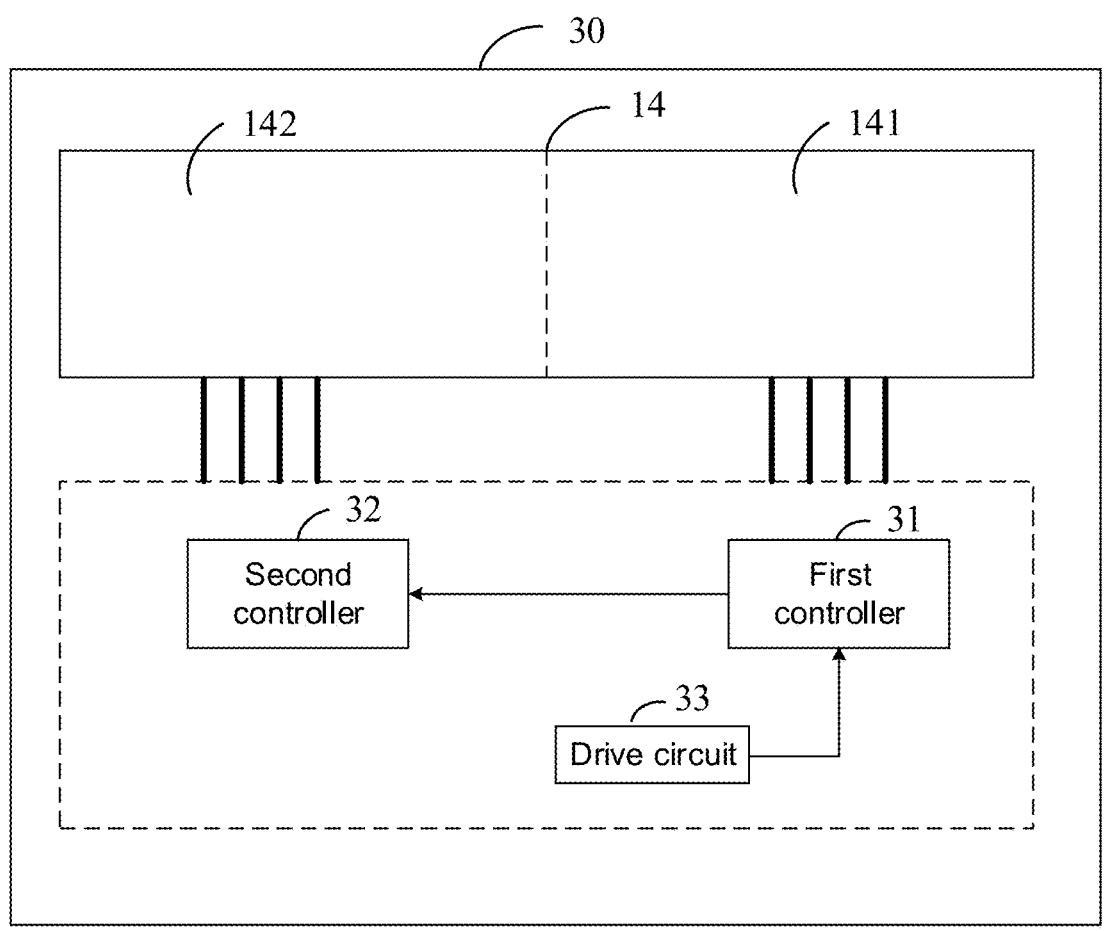
FIG. 3A is a structural diagram of another display device, in accordance with some embodiments.

FIG. 3A shows a display device 30 provided in some embodiments of the present disclosure. The display device 30 may be an organic light-emitting diode (OLED) display device, or a quantum dot light-emitting diode (QLED) display device, the OLED display device may be an active-matrix organic light-emitting diode (AMOLED) display device. Embodiments of the present disclosure do not specially limit a type of the display device 30.

As shown in FIG. 3A, the display device 30 includes a display screen 14, a drive circuit 33, and multiple controllers. The multiple controllers each include, but is not limited to, at least one of an FPGA, an application specific integrated circuit (ASIC), or the like.

For example, the multiple controllers include a first controller 31 and a second controller 32. The first controller 31 may be an FPGA or an ASIC, and the second controller 32 may also be an FPGA or an ASIC. The types of the first controller 31 and the second controller 32 may be same or different, and the number and types of the multiple controllers are not limited by embodiments of the present disclosure.

The display screen 14 includes multiple display regions, the multiple display regions are not overlapped with each other, and each display region is provided therein with a plurality of light-emitting elements. The multiple display regions may include, for example, a first display region 141 and a second display region 142. The first display region 141 and the second display region 142 may constitute all of the display regions of the display screen 14 or may constitute some of the display regions of the display screen 14. The number of the display regions divided in the display screen 14 is not limited in embodiments of the present disclosure.

For example, the first controller 31 is used to perform a display control on the first display region 141, and the second controller 32 is used to perform a display control on the second display region 142. For example, the first controller 31 is used to control light-emitting elements in the first display region 141 to be on or off, and the second controller 32 is used to control light-emitting elements in the second display region 142 to be on or off.

The drive circuit 33 may be, for example, a screen drive board, or may be a dial, a key, or another type of drive circuit. The drive circuit 33 is used to send a control signal to the first controller 31 and/or the second controller 32. The control signal sent by the drive circuit 33 is an external control signal for the first controller 31 and the second controller 32.

In some embodiments, the control signal sent by the drive circuit 33 is used to control the display screen 14 to be on or off. For example, the control signal may include a power-off compensation signal and/or a power-on compensation signal.

Figure 3B:
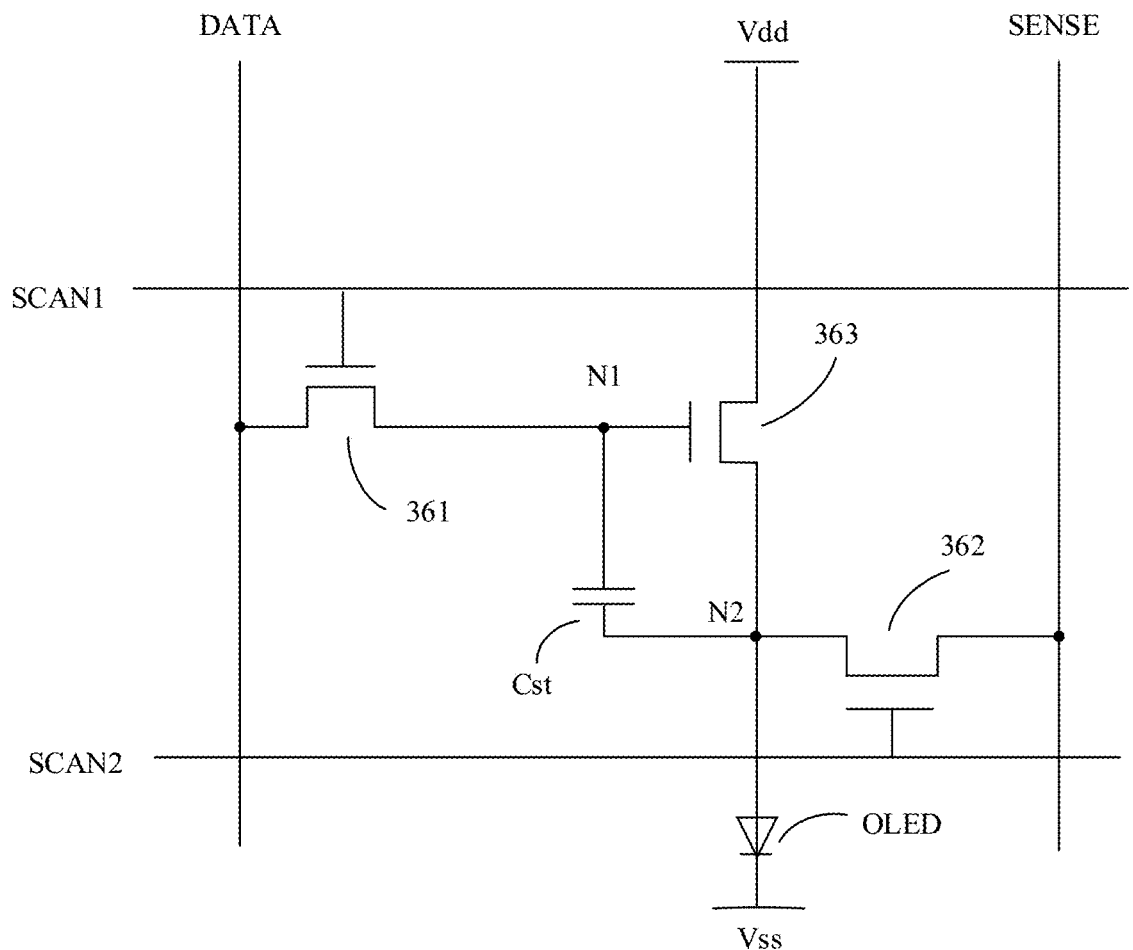
FIG. 3B is a schematic diagram showing a pixel circuit, in accordance with some embodiments.

The display screen 14 may include a plurality of sub-pixels arranged in an array, each sub-pixel includes a light-emitting element OLED and a pixel circuit. FIG. 3B is a schematic diagram showing a pixel circuit, in accordance with embodiments of the present disclosure, where the pixel circuit may be, for example, a 3T1C pixel circuit.

As shown in FIG. 3B, the pixel circuit includes: a first transistor 361, a second transistor 362, a third transistor 363 and a capacitor Cst; where a control electrode of the first transistor 361 is coupled to a gate driving signal line SCAN1, a first electrode of the first transistor 361 is coupled to a data signal terminal DATA, and a second electrode of the first transistor 361 is coupled to a first node N1; a control electrode of the second transistor 362 is coupled to a gate driving signal line SCAN2, a first electrode of the second transistor 362 is coupled to a second node N2, and a second electrode of the second transistor 362 is coupled to a sensing terminal SENSE; a control electrode of the third transistor 363 is coupled to the first node N1, a first electrode of the third transistor 363 is coupled to a voltage terminal Vdd, and a second electrode of the third transistor 363 is coupled to the second node N2; a first end of the capacitor Cst is coupled to the first node N1, and a second end of the capacitor Cst is coupled to the second node N2. A first electrode of the light-emitting element OLED is coupled to the second node N2, and a second electrode of the light-emitting element OLED is coupled to a voltage terminal Vss. Signals of the gate driving signal line SCAN1 and the gate driving signal line SCAN2 may be same or different, which will not be limited in embodiments of the present disclosure.

As shown in FIG. 3B, due to a difference between threshold voltages of transistors (e.g., third transistors 363) in pixel circuits, and/or a difference between mobilities of the transistors (e.g., the third transistors 363) in the pixel circuits, the display panel 14 may have a problem of uneven brightness.

In some embodiments, in order to improve the problem of uneven brightness of the display screen 14 caused by different threshold voltages and/or different mobilities of transistors in different pixel circuits, the control signal in embodiments of the present disclosure includes a compensation signal, the compensation signal is used to compensate threshold voltages and/or mobilities of transistors in the first display region 141 and the second display region 142. Therefore, the problem of display luminance unevenness occurring in the display panel 14 may be ameliorated, and the display quality of the display panel 14 may be improved. For example, the compensation signal may be a Sense Vth and/or a Sense K, and embodiments of the present disclosure do not limit the type of the compensation signal.

The first controller 31 is used to, responding to the control signal, perform a display control on the first display region 141. The second controller 32 is used to, responding to the control signal, perform a display control on the second display region 142. A display time difference between the first display region 141 and the second display region 142 is less than a threshold time period.

In a case where images are displayed in the first display region 141 and the second display region 142 simultaneously, or the display time difference is small (for example, less than the threshold time period), the problem of the splitting-screen phenomenon occurring on the display screen 14 may be ameliorated. In some embodiments, the threshold time period may be less than 14.4 microseconds (μs). For example, the threshold time period may be 10 μs, 5 μs, 3 μs, or another value less than 14.4 μs. Embodiments of the present disclosure do not limit the value of the threshold time period. That is, in a case where the display time difference between the first display region 141 and the second display region 142 is less than 10 μs or 5 μs or 3 μs, users will not notice an appearance of splitting-screen phenomenon on the display screen 14. The threshold time period may also be 0 μs, and in a case where the threshold time period is 0 μs, display times of the first display region 141 and the second display region 142 are completely synchronized, so that the display screen 14 does not have a splitting-screen phenomenon. Moreover, the display device provided in embodiments of the present disclosure can also compensate the threshold voltage and/or the mobility of the transistor through the compensation signal, thereby ameliorating the problem of uneven brightness of the display screen 14, and improving the display quality of the display screen 14.

In some embodiments, as shown in FIG. 3A, the drive circuit 33 is coupled to the first controller 31, and used to send the control signal to the first controller 31.

The first controller 31 is coupled to the second controller 32, and used to: receive the control signal from the drive circuit 33, obtain a first control command according to the control signal, and send the first control command to the second controller 32.

In some embodiments, the first controller 31 may be a master controller and the second controller may be a slave controller. For example, the main controller may be pre-installed in the display device 30. The number of master controllers included in the display device 30 may be one or more, and the number of slave controllers included in the display device 30 may be one or more, and the number of the master controllers and the number of the slave controllers included in the display device 30 are not limited in embodiments of the present disclosure.

As shown in FIG. 3A, considering an example in which the control signal is a power-off compensation signal, the drive circuit 33 sends the power-off compensation signal to the first controller 31, and after receiving the power-off compensation signal, the first controller 31 generates a corresponding first control command (e.g., a first power-off compensation command) by performing a logic processing on the power-off compensation signal, and sends the first power-off compensation command to the second controller 32.

In some embodiments, the first controller 31 transmits the first control command to the second controller 32 through a low-voltage differential signaling (LVDS) or a pin-to-pin. Embodiments of the present disclosure do not limit the transmission manner between the first controller 31 and the second controller 32.

The second controller 32 is used to: receive the first control command, and perform the display control on the second display region 142 based on the first control command.

As shown in FIG. 3A, after receiving the first power-off compensation command sent by the first controller 31, the second controller 32 performs the display control on the second display region 142 based on the first power-off compensation command, so as to control light-emitting elements in the second display region 142 to be off.

The first controller 31 is further used to: after delaying for a first time period from sending the first control command to the second controller 32, perform the display control on the first display region 141 based on the first control command. The first time period is a time period from a time when the first controller 31 sends the first control command to the second controller 32 to a time when the second controller 32 receives and obtains the first control command.

As shown in FIG. 3A, after sending the first power-off compensation command to the second controller 32, the first controller 31 needs to wait for the first time period, and then controls the light-emitting elements in the first display region 141 to be off.

For example, in a case where the first controller 31 transmits the first control command to the second controller 32 through LVDS, the first controller 31 performs processings, such as data packing and encoding, on the first control command, and then transmits the processed first control command to the second controller 32 through LVDS TX; the second controller 32 receives the processed first control command through LVDS RX, decodes the processed control command, and selects a required first control command. In this case, the first time period includes a duration of transmission by the first controller 31 through LVDS TX, a duration of reception by the second controller 32 through LVDS RX, and a duration of processing such as decoding and selecting the first control command, and the time period may be denoted as ΔT1 (e.g., ΔT1 is greater than zero). It can be understood that ΔT1 can be obtained through testing in advance.

Therefore, in the case where the first controller 31 transmits the first control command to the second controller 32 through the LDVS, the time period from a time when the first controller 31 sends the first control command to the second controller 32 to a time when the second controller 32 receives and obtains the first control command is ΔT1, and thus a time for the first controller 31, after waiting for ΔT1, to perform the display control on the first display region 141 is equal to a time for the second controller 32, after obtaining the first control command, to perform the display control on the second display region 142. That is, display controls over the first display region 141 and the second display region 142 are synchronized, so that the display screen 14 does not have a splitting-screen phenomenon.

For example, in a case where the first controller 31 transmits the first control command to the second controller 32 through the pin-to-pin, the first controller 31 directly sends the first control command to the second controller 32 through chip pins, and a duration of the pin-to-pin transmission process is very small and can be ignored in general. That is, in the case where the first controller 31 sends the first control command to the second controller 32 through the pin-to-pin, the duration ΔT1 of the process is about zero. Then, the first controller 31 can perform the display control on the first display region 141 upon sending of the first control command, and the second controller 32 can perform the display control on the second display region 142 according to the first control command upon receipt of the first control command, so that the display time difference between the first display region 141 and the second display region 142 is less than the threshold time period, and the problem of splitting-screen of the display screen 14 is solved.

Figure 4:
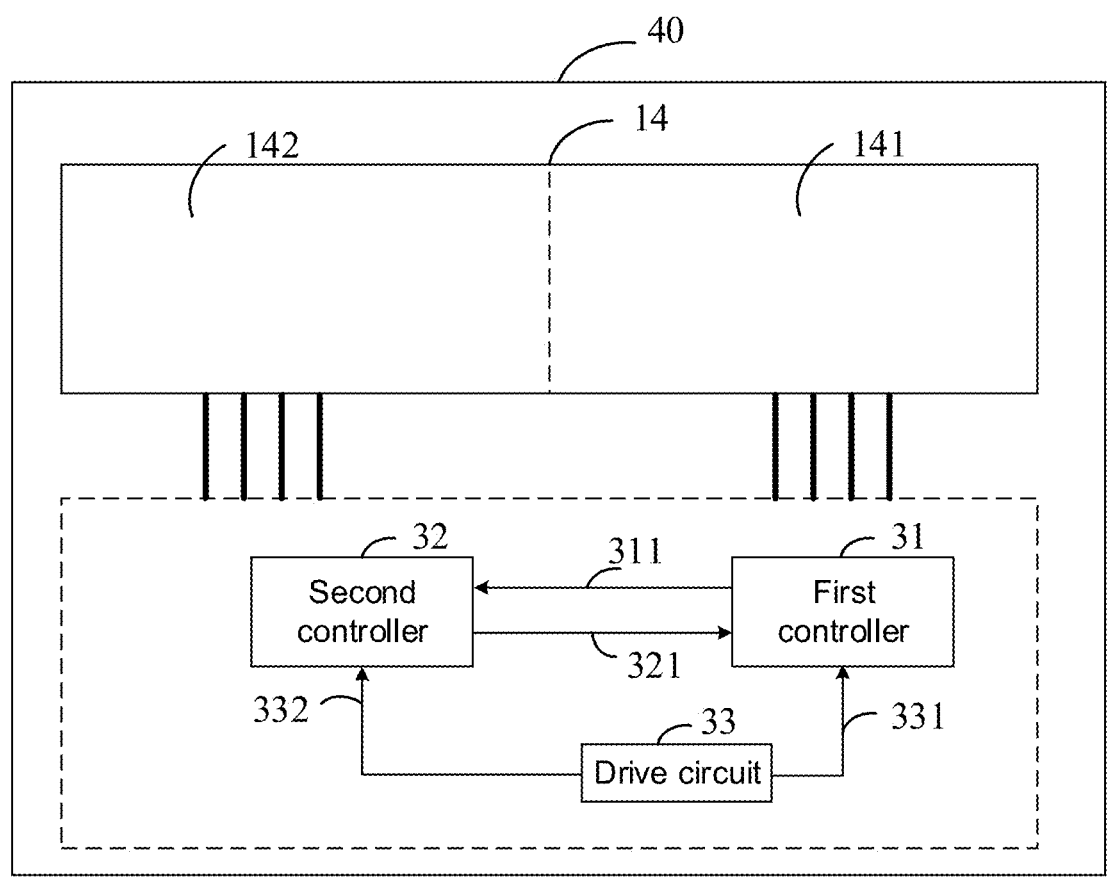
FIG. 4 is a structural diagram of still another display device, in accordance with some embodiments.

To further ensure that there is no splitting-screen phenomenon on the display screen 14, in some embodiments, a display device 40 is also provided, as shown in FIG. 4, the display device 40 differs from the display device 30 shown in FIG. 3A in that the drive circuit 33 is coupled to the second controller 32 in FIG. 4. The circuit function of the display device 40 shown in FIG. 4 will be described below.

In some embodiments, as shown in FIG. 4, the first controller 31 may be a master controller or a slave controller, and the second controller 32 may also be a master controller or a slave controller.

The drive circuit 33 is used to send a control signal to each of the first controller 31 and the second controller 32. The first controller 31 is used to: receive the control signal, generate a first control command based on the control signal, and send the first control command to the second controller 32. The second controller 32 is used to: receive the control signal, generate a second control command based on the control signal, and send the second control command to the first controller 31.

As shown in FIG. 4, considering an example in which the control signal is a power-off compensation signal, the drive circuit 33 sends the power-off compensation signal to the first controller 31 through a signal line 331, and sends the power-off compensation signal to the second controller 32 through a signal line 332 simultaneously. After receiving the power-off compensation signal, the first controller 31 and the second controller 32 generate a corresponding first control command (e.g., a first power-off compensation command) and a corresponding second control command (e.g., a second power-off compensation command) respectively. The first controller 31 sends the first power-off compensation command to the second controller 32, and the second controller 32 sends the second power-off compensation command to the first controller 31.

The first controller 31 is further used to: receive the second control command, and obtain a third control command based on the first control command and the second control command; and perform the display control on the first display region 141 according to the third control command. The second controller 32 is further used to: receive the first control command, and obtain a fourth control command based on the first control command and the second control command; and perform the display control on the second display region 142 according to the fourth control command.

In some embodiments, the third control command and the fourth control command are same, or a rate of signal overlap between the third control command and the fourth control command is greater than 99%. That is, in a case where the third control command and the fourth control command are the same, or the rate of the signal overlap is greater than 99%, the display time difference between the first display region 141 and the second display region 142 is less than the threshold time period, and thus, the screen-splitting phenomenon does not occur on the display screen 14.

As shown in FIG. 4, the first controller 31 sends the first power-off compensation command to the second controller 32 through the signal line 311, and the second controller 32 sends the second power-off compensation command to the first controller 31 through the signal line 321. In some embodiments, the first controller 31 may use a same signal line to send the first power-off compensation command and receive the second power-off compensation command, or may use different signal lines to send the first power-off compensation command and receive the second power-off compensation command respectively. That is, the signal line 311 and the signal line 321 may be a same signal line or different signal lines. The signal line 311 and the signal line 321 may each be a wiring between chip pins of the first controller 31 and the second controller 32, or may each be a wiring between LDVS TX/RX of the first controller 31 and LVDS RX/TX of the second controller 32.

In some embodiments, the third control command includes a control command obtained by the first controller 31 performing an AND operation on the first control command and the second control command. The fourth control command includes a control command obtained by performing an AND operation on the first control command and the second control command by the second controller 32.

Figure 5:
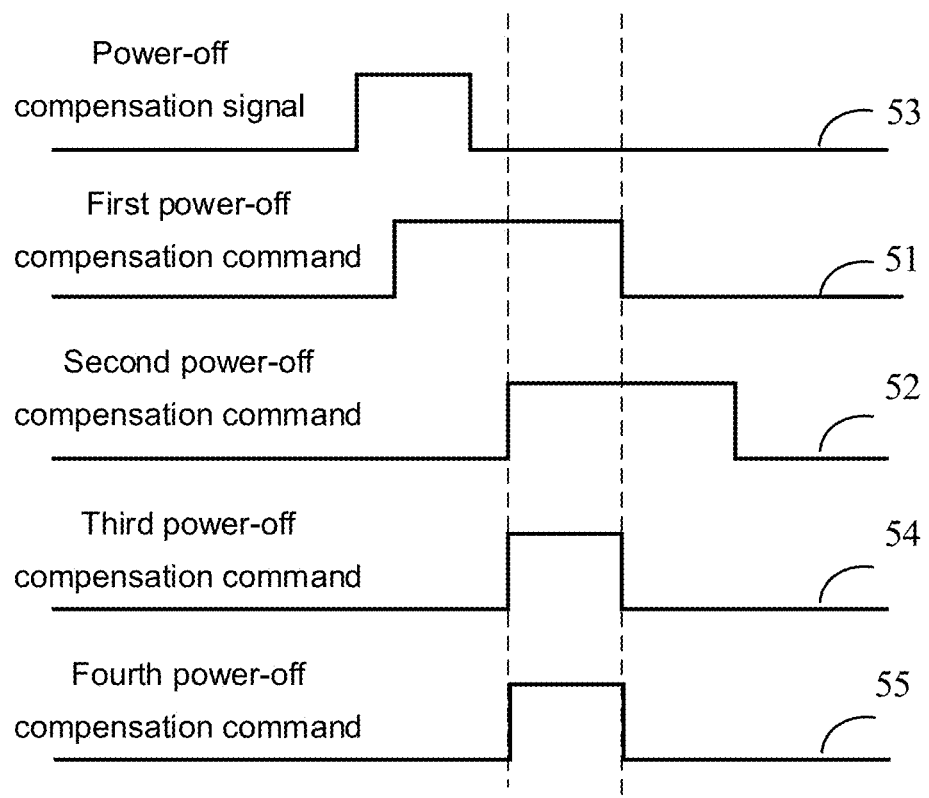
FIG. 5 is a schematic diagram showing a third power-off compensation command generated and a fourth power-off compensation command generated, in accordance with some embodiments.

Embodiments of the present disclosure do not limit the sequence of times when the first controller 31 and the second controller 32 receive the control signal (e.g., the power-off compensation signal 53 shown in FIG. 5) sent by the drive circuit 33. The following description is given by considering an example in which the first controller 31 receives the control signal sent by the drive circuit 33 earlier than the second controller 32. As shown in FIG. 5, the first controller 31 receives the second power-off compensation command 52 sent by the second controller 32, and performs an AND operation on the first power-off compensation command 51 and the second power-off compensation command 52 to obtain a corresponding third control command (e.g., a third power-off compensation command 54). The first controller 31 controls the light-emitting elements in the first display region 141 to be off according to the third power-off compensation command 54. The second controller 32 receives the first power-off compensation command 51 sent by the first controller 31, and performs an AND operation on the first power-off compensation command 51 and the second power-off compensation command 52 to obtain a corresponding fourth control command (e.g., a fourth power-off compensation command 55). The second controller 32 controls the light-emitting elements in the second display region 142 to be off according to the fourth power-off compensation command 55. As shown in FIG. 5, the third power-off compensation command 54 and the fourth power-off compensation command 55 are same.

It will be noted that, a time period of transmitting the first power-off compensation command 51 between the first controller 31 and the second controller 32 is equal to a time period of transmitting the second power-off compensation command 52 between the first controller 31 and the second controller 32, and thus, after a "handshake" operation is performed between the first controller 31 and the second controller 32, the time difference between a time of receiving the power-off compensation signal from the drive circuit 33 by the first controller 31 and a time of receiving the power-off compensation signal from the drive circuit 33 by the second controller 32 can be counteracted, so that the third power-off compensation command 54 for the first controller 31 of the display device 40 to perform the display control and the fourth control command 55 for the second controller 32 of the display device 40 to perform the display control are the same or have the signal overlap rate greater than 99%. Therefore, in the case where the first controller 31 controls the light-emitting elements in the first display region 141 to be off based on the third power-off compensation command 54, and the second controller 32 controls the light-emitting elements in the second display region 142 to be off based on the fourth power-off compensation command 55, it can be ensured that the display time difference between the first display region 141 and the second display region 142 is less than the threshold time period, and the problem of splitting-screen of the display screen 14 is solved. Moreover, by performing the "handshake" operation between the first controller 31 and the second controller 32, a problem of splitting-screen of the display screen 14 due to an abnormal transmission between the drive circuit 33 and the first controller 31 or the second controller 32 can be avoided, and a problem of splitting-screen of the display screen 14 due to an abnormal transmission between the first controller 31 and the second controller 32 can also be avoided.

Figure 6:
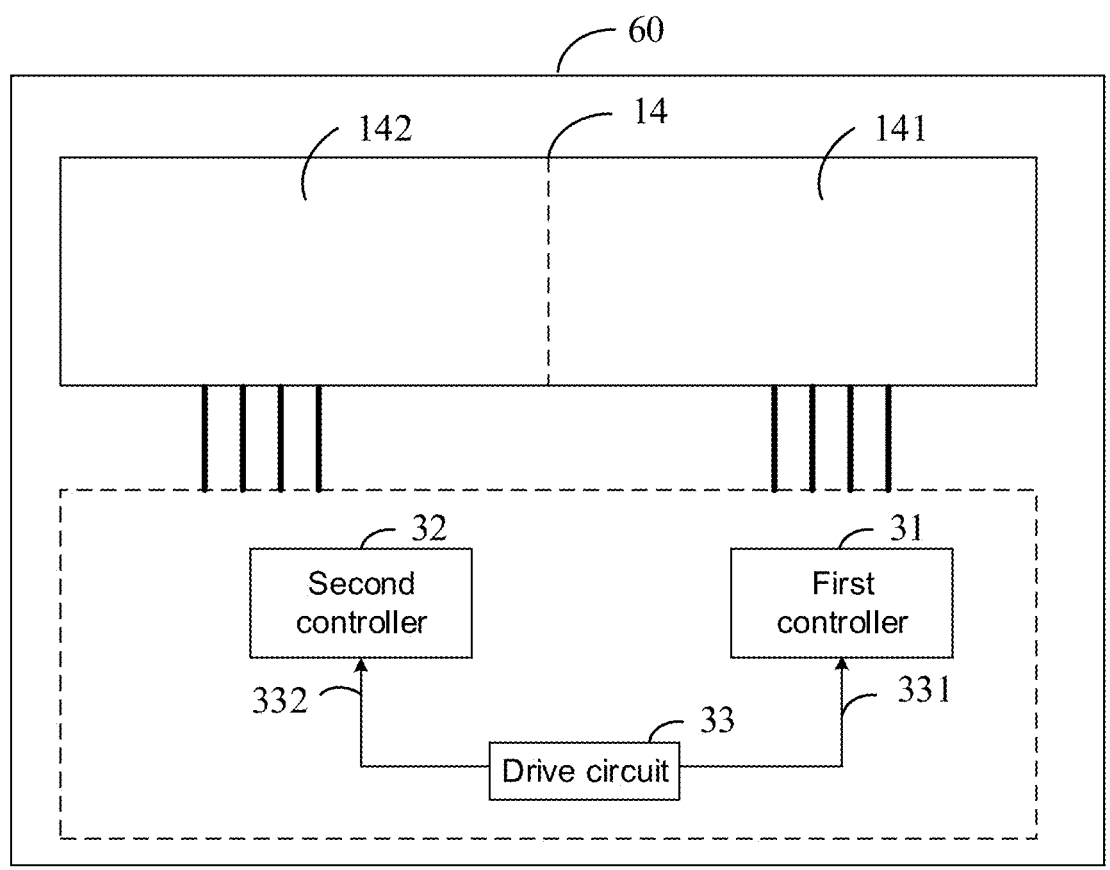
FIG. 6 is a structural diagram of still another display device, in accordance with some embodiments.

In some embodiments, as shown in FIG. 6, in a display device 60, a signal line 331 from a drive circuit 33 to a first controller 31 has a same length as a signal line 332 from the drive circuit 33 to a second controller 32.

As shown in FIG. 6, considering an example in which the control signal is a power-off compensation signal, the drive circuit 33 sends the power-off compensation signal to the first controller 31 through the signal line 331, and sends the power-off compensation signal to the second controller 32 through the signal line 332 simultaneously. Since the lengths of the signal line 331 from the drive circuit 33 to the first controller 31 and the signal line 332 from the drive circuit 33 to the second controller 32 are equal, times of the power-off compensation signal sent by the drive circuit 33 reaching the first controller 31 and the second controller 32 are equal, so that the first controller 31 and the second controller 32 can respectively perform a synchronous control on the first display region 141 and the second display region 142, and the splitting-screen of the display screen 14 is avoided.

Figure 7:
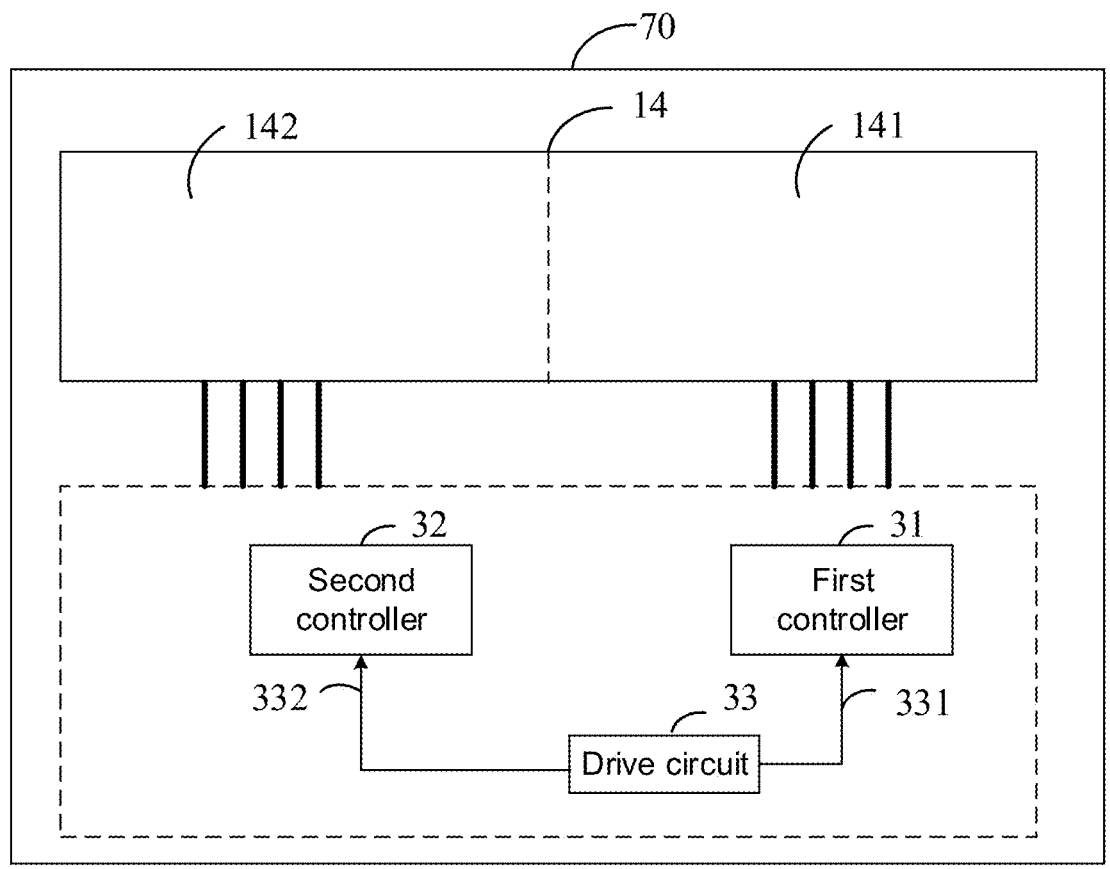
FIG. 7 is a structural diagram of still another display device, in accordance with some embodiments.

In order to further reduce the design difficulty and manufacturing cost of the display device and ensure that the display screen 14 does not have the splitting-screen, in some embodiments, a display device 70 is further provided, and the circuit function of the display device 70 shown in FIG. 7 is described below by considering an example in which in the display device 70, the length of the signal line 331 from the drive circuit 33 to the first controller 31 is less than the length of the signal line 332 from the drive circuit 33 to the second controller 32.

The drive circuit 33 is coupled to the first controller 31 and the second controller 32 and used to send a control signal to each of the first controller 31 and the second controller 32.

The second controller 32 is used to: receive the control signal, and obtain a second control command according to the control signal; and perform the display control on the second display region 142 based on the second control command.

The first controller 31 is used to: receive the control signal, and obtain a first control command according to the control signal; and after delaying for a second time period from obtaining the control signal, perform the display control on the first display region 141 based on the first control command. The second time period is a time period from a time when the second controller 32 receives the control signal to a time when the first controller 31 receives the control signal.

For example, as shown in FIG. 7, since the length of the signal line 331 from the drive circuit 33 to the first controller 31 is less than the length of the signal line 332 from the drive circuit 33 to the second controller 32, the first controller 31 receives the power-off compensation signal earlier than the second controller 32 receives the power-off compensation signal. Therefore, after the first controller 31 waits for the second time duration ΔT2 after receiving the power-off compensation signal, that is, after the first controller 31 waits until the second controller 32 also receives the power-off compensation signal sent by the drive circuit 33, the first controller 31 controls an off-time of light-emitting elements in the first display region 141 based on a corresponding first control command (e.g., a first power-off compensation command), and keeps synchronization with an off-time of light-emitting elements in the display region 142 controlled by the second controller 32 through a corresponding second control command (e.g., a second power-off compensation command).

For example, the second time duration ΔT2 may be obtained through testing in advance. For example, the time difference ΔT2, ΔT2=T2−T1 may be calculated by measuring a time T1 when the first controller 31 receives the power-off compensation signal from the drive circuit 33 and a time T2 when the second controller 32 receives the power-off compensation signal from the drive circuit 33 in advance. The magnitude of ΔT2 is related to the lengths of the signal line 331 and the signal line 332.

Figure 8:
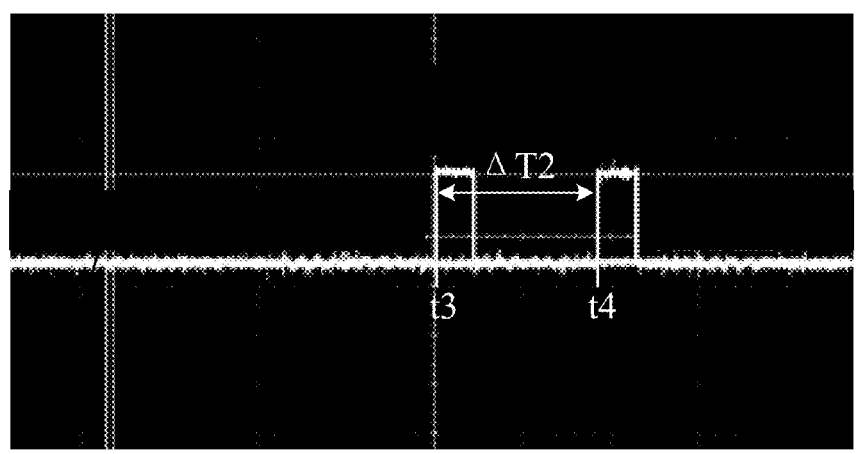
FIG. 8 is a schematic diagram showing a time difference between power-off compensation signals received by multiple controllers, in accordance with some embodiments.
Figure 9:
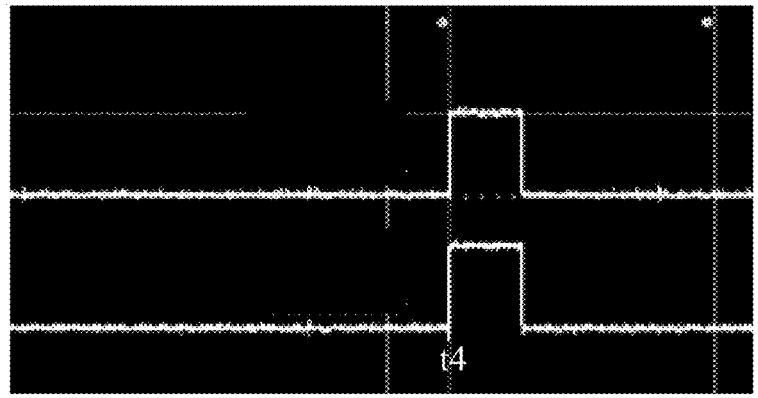
FIG. 9 is a schematic diagram showing power-off compensation signals received by multiple controllers synchronously, in accordance with some embodiments.

As shown in FIG. 8, considering an example in which ΔT2 obtained through testing is 14.4 μs, the first controller 31 receives the power-off compensation signal sent by the drive circuit 33 at moment t3, and the second controller 32 receives the power-off compensation signal sent by the drive circuit 33 at moment t4. As shown in FIG. 9, after waiting for 14.4 μs after the first controller 31 receives the power-off compensation signal at moment t3, the first controller 31 controls the light-emitting elements in the first display region 141 to be off, that is, the first controller 31 controls the light-emitting elements in the first display region 141 to be off at moment t4. Upon receipt of the power-off compensation signal at moment t4, the second controller 32 controls the light-emitting elements in the second display region 142 to be off, so that the time for the first controller 31 to control the first display region 141 to be off is equal to the time for the second controller 32 to control the second display region 142 to be off, and the problem of splitting-screen of the display screen 14 is solved.

Some embodiments of the present disclosure provide a pixel circuit, which is applied to a display screen, for example, the display screen 14 in the above embodiments. The display screen 14 includes a first display region 141 and a second display region 142, pixel circuits in the first display region 141 and pixel circuits in the second display region 142 are each used to receive a compensation signal, and the compensation signal is used to compensate threshold voltages and/or mobilities of transistors of the pixel circuits in the first display region 141 and the second display region 142, so that a display time difference between the first display region 141 and the second display region 142 is less than a threshold time period.

A pixel circuit in the first display region 141 and a pixel circuit in the second display region 142 may be same or different. For example, the pixel circuit in the first display region 141 and the pixel circuit in the second display region 142 may each be the pixel circuit shown in FIG. 3B. The compensation signal received by the pixel circuit may be, for example, Sense Vth and/or Sense K in the above embodiments. The compensation signal Sense Vth and/or Sense K can compensate for the threshold voltage and/or the mobility of the transistors in the pixel circuits in the first display region 141 and the second display region 142, so that the display time difference between the first display region 141 and the second display region 142 is less than the threshold time period, for example, less than 14.4 μs, thereby ensuring that the display screen 14 does not have a splitting-screen phenomenon.

Figure 10:
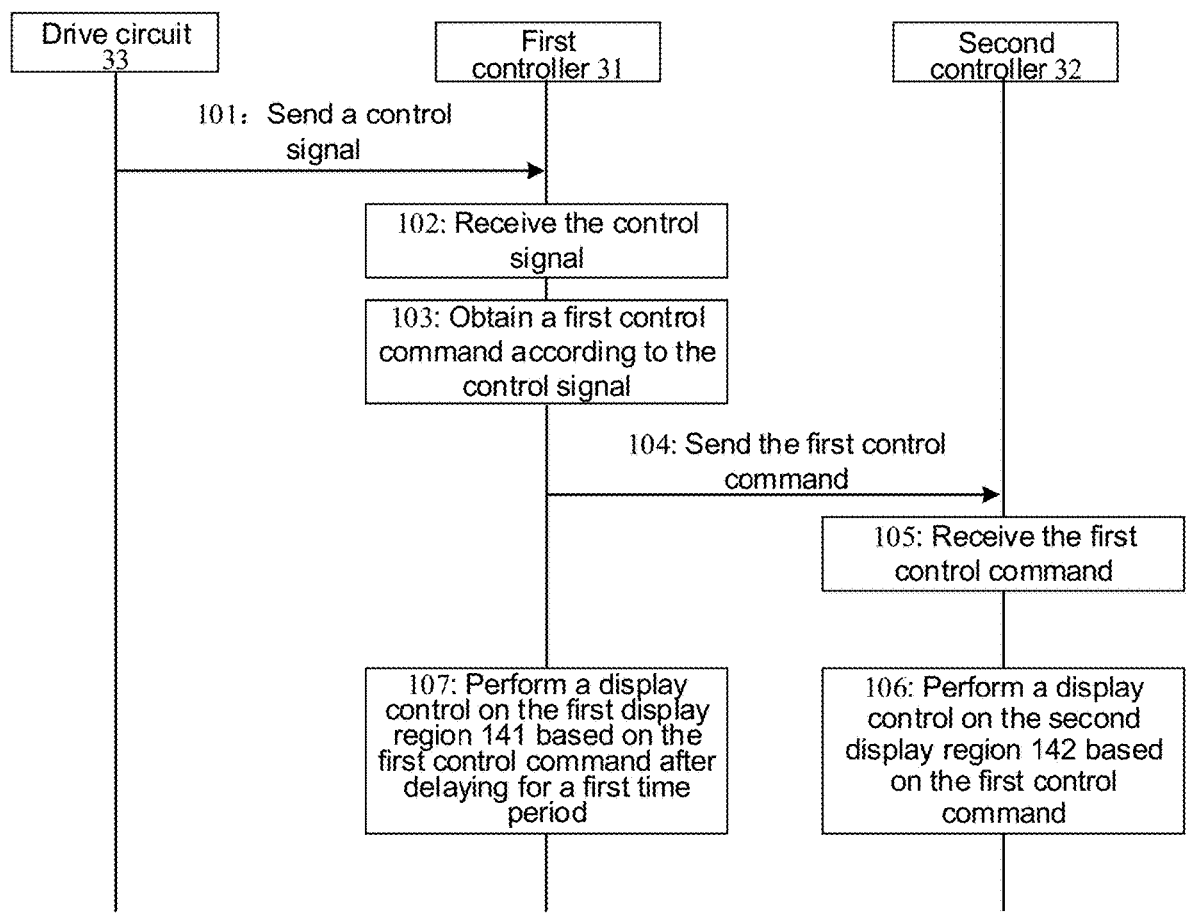
FIG. 10 is a flow diagram of a signal synchronization method of a display device, in accordance with some embodiments.

Some embodiments of the present disclosure provide a signal synchronization method of a display device. In some embodiments, as shown in FIG. 10, the signal synchronization method of the display device includes step 101 to step 107.

In step 101, a drive circuit 33 sends a control signal to a first controller 31.

In step 102, the first controller 31 receives the control signal.

In step 103, the first controller 31 obtains a first control command according to the control signal.

In step 104, the first controller 31 sends a first control command to the second controller 32.

In step 105, a second controller 32 receives a first control command.

In step 106, the second controller 32 performs a display control on the second display region 142 based on the first control command.

In step 107, the first controller 31 performs the display control on the first display region 141 based on the first control command, after delaying for a first time period from sending the first control command to the second controller 32.

For example, the first time period is a time period from a time when the first controller 31 sends the first control command to the second controller 32 to a time when the second controller 32 receives and obtains the first control command.

In some embodiments, the first controller 31 is a master controller and the second controller 32 is a slave controller.

Figure 11:
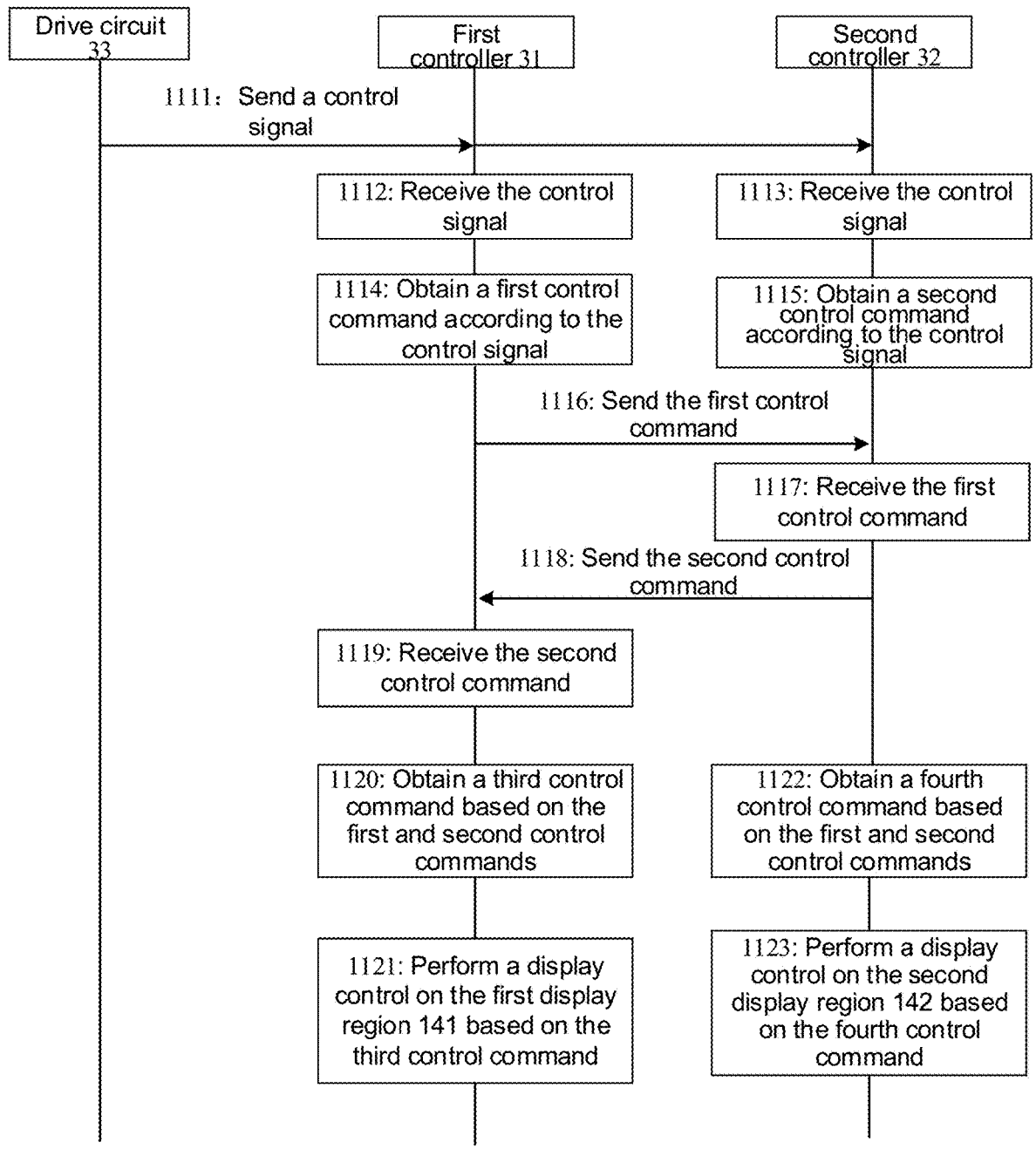
FIG. 11 is a flow diagram of a signal synchronization method of another display device, in accordance with some embodiments.

In some embodiments, as shown in FIG. 11, the signal synchronization method of the display device 40 includes step 1111 to step 1123.

In step 1111, a drive circuit 33 sends a control signal to each of a first controller 31 and a second controller 32.

In step 1112, the first controller 31 receives the control signal.

In step 1113, the second controller 32 receives the control signal.

In step 1114, the first controller 31 obtains a first control command according to the control signal.

In step 1115, the second controller 32 obtains a second control command according to the control signal.

In step 1116, the first controller 31 sends the first control command to the second controller 32.

In step 1117, the second controller 32 receives the first control command.

In step 1118, the second controller 32 sends the second control command to the first controller 31.

In step 1119, the first controller 31 receives the second control command.

In step 1120, the first controller 31 obtains a third control command based on the first control command and the second control command.

In step 1121, the first controller 31 performs a display control on the first display region 141 based on the third control command.

In step 1122, the second controller 32 obtains a fourth control command based on the first control command and the second control command.

In step 1123, the second controller 32 performs a display control on the second display region 142 based on the fourth control command.

The sequence of executing step 1111 to step 1123 is not limited in embodiments of the present disclosure, for example, step 1116 may be executed before step 1118, or may be executed after step 1118, or may be executed simultaneously with step 1118.

In some embodiments, the third control command and the fourth control command may be same, or a rate of signal overlap between the third control command and the fourth control command may be greater than 99%.

In some embodiments, in the above method, obtaining, by the first controller 31, the third control command based on the first control command and the second control command, includes: performing an AND operation on the first control command and the second control command to obtain the third control command.

In the above method, obtaining, by the second controller 32, the fourth control command based on the first control command and the second control command, includes: performing an AND operation on the first control command and the second control command to obtain the fourth control command.

In some embodiments, the first control command and/or the second control command are transmitted between the first controller 31 and the second controller 32 through a low-voltage differential signaling LVDS or a pin-to-pin.

Figure 12:
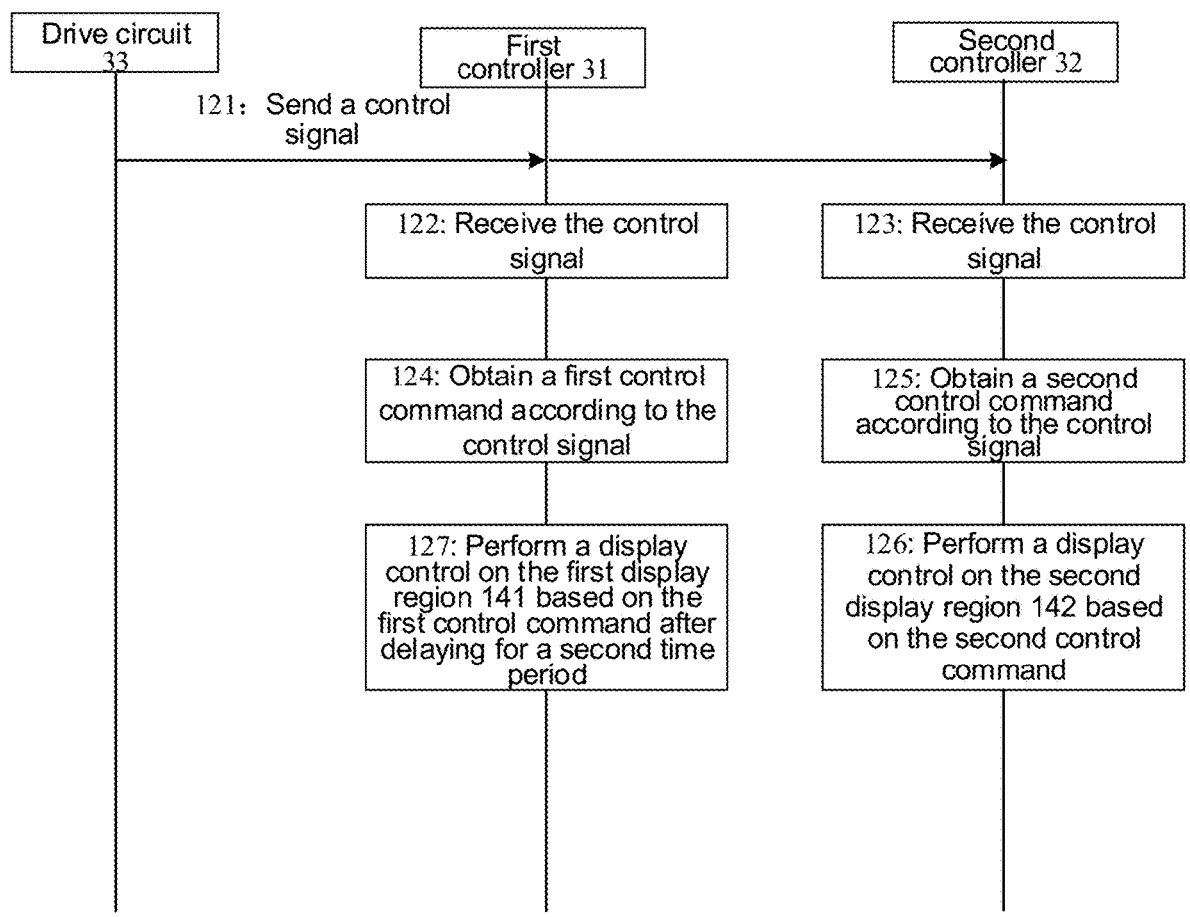
FIG. 12 is a flow diagram of a signal synchronization method of still another display device, in accordance with some embodiments.

In some embodiments, as shown in FIG. 12, the signal synchronization method of the display device 70 includes step 121 to step 127.

In step 121, a drive circuit 33 sends a control signal to each of a first controller 31 and a second controller 32.

In step 122, the first controller 31 receives the control signal.

In step 123, the second controller 32 receives the control signal.

In step 123, the first controller 31 obtains a first control command according to the control signal.

In step 125, the second controller 32 obtains a second control command according to the control signal.

In step 126, the second controller 32 performs a display control on the second display region 142 based on the second control command.

In step 127, the first controller 31 performs a display control on the first display region 141 based on the first control command after delaying for a second time period from obtaining the control signal.

For example, the second time period is a time period from a time when the second controller 32 receives the control signal to a time when the first controller 31 receives the control signal.

In some embodiments, a length of a signal line from the drive circuit 33 to the first controller 31 is equal to a length of a signal line from the drive circuit 33 to the second controller 32 in the above method.

In some embodiments, the control signal is used to control the display screen 14 to be on or off. The control signal includes a compensation signal that may be used to compensate for threshold voltages and/or mobilities of transistors in the first display region 141 and the second display region 142.

Some embodiments of the present disclosure provide a computer-readable storage medium (e.g., a non-transitory computer-readable storage medium), the computer-readable storage medium stores therein computer program instructions that, when run on a computer (e.g., a display device), cause the computer to execute the signal synchronization method of the display device described in any of the above embodiments.

For example, the computer-readable storage medium may include, but is not limited to a magnetic storage device (e.g., a hard disk, a floppy disk or a magnetic tape), an optical disk (e.g., a compact disk (CD), a digital versatile disk (DVD)), a smart card and a flash memory device (e.g., an erasable programmable read-only memory (EPROM), a card, a stick or a key driver). Various computer-readable storage media described in the present disclosure may represent one or more devices and/or other machine-readable storage media for storing information. The term "machine-readable storage medium" may include, but is not limited to, wireless channels and various other media capable of storing, containing and/or carrying instructions and/or data.

Some embodiments of the present disclosure provide a computer program product, for example, the computer program product is stored on a non-transitory computer-readable storage medium. The computer program product includes computer program instructions that, when run on a computer (e.g., a display device), cause the computer to execute the signal synchronization method of the display device described in the above embodiments.

Some embodiments of the present disclosure further provide a computer program. When executed by a computer, the computer program causes the computer to perform the data processing method as described in the above embodiments.

Beneficial effects of the computer-readable storage medium, the computer program product, and the computer program are same as the beneficial effects of the method as described in some embodiments described above, and details will not be repeated here.

The foregoing description is only specific embodiments of the present disclosure, but the scope of protection of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display device, comprising:
    a display screen, including a first display region and a second display region;
    a first controller and a second controller; and
    a drive circuit, configured to transmit a control signal to at least one of the first controller or the second controller, wherein
    the first controller is configured to: receive the control signal, obtain a first control command according to the control signal, and send the first control command to the second controller;
    the second controller is configured to: receive the control signal, obtain a second control command according to the control signal, and send the second control command to the first controller;
    the first controller is further configured to: receive the second control command, and obtain a third control command based on the first control command and the second control command; and perform the display control on the first display region according to the third control command; and
    the second controller is further configured to: receive the first control command, and obtain a fourth control command based on the first control command and the second control command; and perform the display control on the second display region according to the fourth control command, wherein
    a display time difference between the first display region and the second display region is less than a threshold time period.

2. The display device according to claim 1, wherein
    the first controller is further configured to perform an AND operation on the first control command and the second control command to obtain the third control command; and
    the second controller is further configured to perform an AND operation on the first control command and the second control command to obtain the fourth control command.

3. The display device according to claim 1, wherein
    the control signal is configured to control the display screen to be on or off; the control signal includes a compensation signal, and the compensation signal is configured to compensate for at least one of a threshold voltage or a mobility of transistors in the first display region and the second display region.

4. The display device according to claim 1, wherein the threshold time period is less than 14.4 microseconds.

5. A pixel circuit, applied to a display screen of a display device, wherein the display device comprises:
    the display screen, wherein the display screen includes a first display region and a second display region, a pixel circuit in the first display region and a pixel circuit in the second display region are each the pixel circuit, and configured to receive a compensation signal, and the compensation signal is configured to compensate at least one of a threshold voltage or a mobility of transistors of the pixel circuits in the first display region and the second display region, so that a display time difference between the first display region and the second display region is less than a threshold time period;
    a first controller and a second controller; and
    a drive circuit, configured to transmit a control signal to at least one of the first controller or the second controller, wherein
    the first controller is configured to: receive the control signal, obtain a first control command according to the control signal, and send the first control command to the second controller;
    the second controller is configured to: receive the control signal, obtain a second control command according to the control signal, and send the second control command to the first controller;
    the first controller is further configured to: receive the second control command, and obtain a third control command based on the first control command and the second control command; and perform the display control on the first display region according to the third control command; and
    the second controller is further configured to: receive the first control command, and obtain a fourth control command based on the first control command and the second control command; and perform the display control on the second display region according to the fourth control command.

6. The pixel circuit according to claim 5, wherein the threshold time period is less than 14.4 microseconds.

7. A signal synchronization method of a display device, wherein the display device includes a display screen, a first controller and a second controller, the display screen includes a first display region and a second display region, the first controller is configured to control the first display region, and the second controller is configured to control the second display region; the signal synchronization method comprises:

receiving, by at least one of the first controller or the second controller, a control signal from a drive circuit;

performing, by the at least one of the first controller or the second controller, a display control on a corresponding display region responding to the control signal, including at least one of:

performing, by the first controller, a display control on the first display region responding to the control signal; or performing, by the second controller, a display control on the second display region responding to the control signal, wherein a display time difference between the first display region and the second display region is less than a threshold time period; wherein in a case where the first controller and the second controller receive the control signal from the drive circuit, the method further comprises:

obtaining, by the first controller, a first control command according to the control signal, and sending, by the first controller, the first control command to the second controller;

obtaining, by the second controller, a second control command according to the control signal, and sending, by the second controller, the second control command to the first controller;

receiving, by the first controller, the second control command; and receiving, by the second controller, the first control command, wherein performing, by the first controller, the display control on the first display region, includes: obtaining, by the first controller, a third control command based on the first control command and the second control command; and performing, by the first controller, the display control on the first display region according to the third control command; and performing, by the second controller, the display control on the second display region, includes: obtaining, by the second controller, a fourth control command based on the first control command and the second control command; and performing, by the second controller, the display control on the second display region according to the fourth control command.

8. The signal synchronization method according to claim 7, wherein the third control command and the fourth control command are same, or a rate of signal overlap between the third control command and the fourth control command is greater than 99%.

9. The signal synchronization method according to claim 7, wherein obtaining the third control command based on the first control command and the second control command, includes:

performing an AND operation on the first control command and the second control command to obtain the third control command.

10. The signal synchronization method according to claim 7, wherein the control signal is configured to control the display screen to be on or off; the control signal includes a compensation signal, and the compensation signal is configured to compensate for at least one of a threshold voltage or a mobility of transistors in the first display region and the second display region; and/or the threshold time period is less than 14.4 microseconds.

11. The display device according to claim 1, wherein the first controller and the second controller are configured such way that at least one of the first control command or the second control command is transmitted therebetween through a low-voltage differential signal (LVDS) or a pin-to-pin.

* * * * *